United States Patent
Usui et al.

(10) Patent No.: US 6,596,813 B2
(45) Date of Patent: Jul. 22, 2003

(54) COMPOSITION OF EPOXY RESIN, PHENOLIC RESIN, BUTADIENE PARTICLES AND AMINO SILICONE OIL

(75) Inventors: Hideyuki Usui, Osaka (JP); Satoshi Okuda, Osaka (JP); Minoru Nakao, Osaka (JP)

(73) Assignee: Nitto Denko Corporation, Osaka (JP)

(*) Notice: Subject to any disclaimer, the term of this patent is extended or adjusted under 35 U.S.C. 154(b) by 54 days.

(21) Appl. No.: 09/902,584

(22) Filed: Jul. 12, 2001

(65) Prior Publication Data

US 2003/0018132 A1 Jan. 23, 2003

Related U.S. Application Data

(62) Division of application No. 09/296,666, filed on Apr. 22, 1999, now Pat. No. 6,288,169.

(30) Foreign Application Priority Data

Apr. 23, 1998 (JP) ............................................. 10-113744
Mar. 11, 1999 (JP) ............................................. 11-064655

(51) Int. Cl.$^7$ ............................ C08L 63/00; C08L 63/04
(52) U.S. Cl. ........................................ 525/109; 525/65
(58) Field of Search ..................... 525/65, 109; 257/793

(56) References Cited

U.S. PATENT DOCUMENTS

| | | | |
|---|---|---|---|
| 4,916,174 A | 4/1990 | Yoshizumi et al. | 523/436 |
| 5,043,211 A | 8/1991 | Yoshizumi et al. | 525/479 |
| 5,216,077 A | 6/1993 | Yoshizumi et al. | 525/68 |
| 5,668,209 A | 9/1997 | Ruch et al. | 524/555 |
| 5,948,469 A | 9/1999 | Morita et al. | 523/204 |

FOREIGN PATENT DOCUMENTS

| | | |
|---|---|---|
| JP | 6-67558 | 4/1985 |
| JP | 63-225618 | 9/1988 |
| JP | 6-302723 | 10/1994 |
| JP | 8-41171 | 2/1996 |
| JP | 9-3168 | 1/1997 |
| JP | 9-208667 | 8/1997 |
| JP | 11-92634 | 4/1999 |
| JP | 11-100488 | 4/1999 |
| WO | WO 97/14280 | 4/1997 |

*Primary Examiner*—Robert E. L. Sellers
(74) *Attorney, Agent, or Firm*—Sughrue Mion, PLLC

(57) ABSTRACT

An epoxy resin composition for semiconductor encapsulation comprising (A) an epoxy resin, (B) a phenolic resin, and (C) butadiene rubber particles having an average particle size of secondary particles of 100 μm or smaller and having such a size distribution that the proportion of secondary particles having a particle size of 250 μm or smaller is 97% by weight or more, and the proportion of secondary particles having a particle size of 150 μm or smaller is 80% by weight or more; and (D) a silicone oil having at least one amino group per molecule. Component (C) is uniformly dispersed in the composition without forming coarse agglomerates to secure low stress properties.

4 Claims, No Drawings

COMPOSITION OF EPOXY RESIN, PHENOLIC RESIN, BUTADIENE PARTICLES AND AMINO SILICONE OIL

This is a divisional of application Ser. No. 09/296,666 filed Apr. 22, 1999, U.S. Pat. No. 6,288,169 the disclosure of which is incorporated herein by reference.

FIELD OF THE INVENTION

This invention relates to an epoxy resin composition for semiconductor encapsulation, which has low stress properties and high reliability against moisture, a process for producing the epoxy resin composition, and a semiconductor device encapsulated with the epoxy resin composition.

BACKGROUND OF THE INVENTION

Semiconductor elements, such as transistors and IC chips, are encapsulated into ceramic or plastic packages to be supplied as semiconductor devices protected from the outer environment and easy to handle. Ceramic packages have excellent moisture resistance because of the character of the ceramic material itself and impose little stress to the semiconductor element because of their hollow structure. Ceramic packages therefore achieve highly reliable encapsulation. However, the ceramic materials are expensive, and the ceramic packages are less practical for mass production than plastic packages.

Therefore, plastic packages using an epoxy resin composition have been leading recently. Plastic packages, while suitable for mass production and less expensive, allow moisture to permeate and have a greater linear expansion coefficient as compared with a semiconductor element encapsulated. Therefore, it has been a weighty subject in the art to improve moisture resistance and low stress properties.

The stress problem of encapsulating resins has been coped with by dispersing rubber particles, such as butadiene rubber particles, in the resin matrix. However, since rubber particles exhibit high cohesion, commercially available butadiene rubber particles usually have an average secondary particle diameter of about 100 to 500 $\mu$m. Such rubber particles fail to be dispersed uniformly in the encapsulating resin, which has imposed a limitation on the improvement in low stress properties required of a semiconductor encapsulation material.

SUMMARY OF THE INVENTION

An object of the present invention is to provide an epoxy resin composition for encapsulating semiconductors in which rubber particles are uniformly dispersed, being prevented from agglomerating.

Another object of the invention is to provide a process for producing such an epoxy resin composition without involving complicated steps.

Still another object of the invention is to provide a semiconductor device which is free from the problems of stress and moisture penetration.

The inventors of the present invention have conducted extensive study for the purpose of obtaining an encapsulating resin that achieves reduction in stress and improvement in reliability against moisture attack without affecting the appearance. The inventors' study has been focused on a means for uniformly dispersing butadiene rubber particles in an epoxy resin composition while preventing the particles from forming large secondary particles without involving complicated steps. Noting that butadiene rubber particles are liable to agglomerate, the inventors have conducted investigation chiefly into the average particle size of secondary particles and the proportions of secondary particles falling in specific size ranges. As a result, they have succeeded in uniformly dispersing butadiene rubber particles in an epoxy resin composition by using butadiene rubber particles having a specific average particle size and a specific particle size distribution of secondary particles.

The inventors have also found that reliability against moisture is further ensured by adding silicone oil having at least one amino group per molecule together with the specific butadiene rubber particles. The present invention has been completed based on these findings.

That is, the above objects of the invention are accomplished by;

(1) An epoxy resin composition comprising
   (A) an epoxy resin,
   (B) a phenolic resin, and
   (C) butadiene rubber particles having an average particle size of secondary particles of 100 $\mu$m or smaller and having such a size distribution that the proportion of secondary particles having a particle size of 250 $\mu$m or smaller is 97% by weight or more, and the proportion of secondary particles having a particle size of 150 $\mu$m or smaller is 80% by weight or more;

(2) A semiconductor device comprising a semiconductor element encapsulated in the above-described epoxy resin composition.

(3) A process for producing the above-described epoxy resin composition, comprising mixing at least components A, B and C described above; and (4) A semiconductor device comprising a semiconductor element encapsulated in an epoxy resin composition produced by the above-described process.

Having the above-described specific size and size distribution, the butadiene rubber particles used in the invention are uniformly dispersed in the matrix resin without forming coarse agglomerates, which can be achieved without involving complicated steps, thereby providing an epoxy resin composition for semiconductor encapsulation with ease and at low cost. The semiconductor device sealed in the epoxy resin composition of the invention exhibits excellent low stress properties owing to the uniformly dispersed specific butadiene rubber particles. The epoxy resin composition additionally comprising silicone oil having at least one amino group per molecule exhibits further improved reliability against moisture.

DETAILED DESCRIPTION OF THE INVENTION

The epoxy resin composition according to the present invention comprises (A) an epoxy resin, (B) a phenolic resin, and (C) specific butadiene rubber particles. It is usually supplied in the form of powder or tablets.

The epoxy resin as component (A) is not particularly limited and includes various types of epoxy resins, such as a dicyclopentadiene type, a cresol novolak type, a phenol novolak type, bisphenol type, and a biphenyl type. These epoxy resins can be used either individually or a mixture of two or more thereof. Of these epoxy resins preferred are those having a melting point or softening point that is higher than room temperature. Generally useful epoxy resins include novolak epoxy resins having an epoxy equivalent of 150 to 250 and a softening point of 50 to 130° C. and cresol novolak epoxy resins having an epoxy equivalent of 180 to 210 and a softening point of 60 to 110° C.

The phenolic resin as component (B) acts as a curing agent for the epoxy resin. It is not particularly limited and includes dicyclopentadiene type phenolic resins, phenol novolak resins, cresol novolak resins, and phenol aralkyl resins. They can be used either individually or as a mixture of two or more thereof. Phenolic resins having a hydroxyl equivalent of 70 to 250 and a softening point of 50 to 110° C. are preferably used.

The phenolic resin as component (B) is preferably used in such an amount that the hydroxyl equivalent of the phenolic resin is 0.5 to 2.0, particularly 0.8 to 1.2, per epoxy equivalent of the epoxy resin as component (A).

The butadiene rubber particles as component (C) are usually obtained by copolymerization of butadiene and comonomers such as alkyl methacrylates, alkyl acrylates, and styrene. Examples of typical butadiene rubbers are a methyl acrylate-butadiene-styrene copolymer, a methyl acrylate-butadiene-vinyltoluene copolymer, a butadiene-styrene copolymer, a methyl methacrylate-butadiene-styrene copolymer, methyl methacrylate-butadiene-vinyltoluene copolymer, a methyl methacrylate-ethyl acrylate-butadiene-styrene copolymer, a butadiene-vinyltoluene copolymer, and an acrylonitrile-butadiene copolymer. Preferred of them is a methyl methacrylate-butadiene-styrene copolymer, particularly one having a butadiene content of 70% by weight or less and a methyl methacrylate content of 15% by weight or more. An especially preferred is a methyl methacrylate-butadiene-styrene copolymer having a butadiene content of 40 to 70% by weight and a total content of methyl methacrylate and styrene of 30 to 60% by weight. The weight ratio of styrene to methyl methacrylate is preferably 0.5 to 2.0. A methyl methacrylate-butadiene-styrene copolymer prepared by pulverizing a commercially available Metaburene (a powdered product of Mitsubishi Rayon Co., Ltd.) by freeze grinding, etc. can also be used as component (C).

It is also preferred for the butadiene rubber particles to have a core-shell structure. The butadiene rubber particles having a core-shell structure are composed of a core of a butadiene rubber and an outer shell of a polymer resin. The butadiene rubber making the core includes a styrene-butadiene copolymer latex and an acrylonitrile-butadiene copolymer latex, and the polymer resin making the outer shell includes a polymer resin having a glass transition temperature of 70° C. or higher. The polymer resin is obtained by polymerizing an unsaturated monomer having an unsaturated double bond, such as methyl methacrylate, acrylonitrile, and styrene. Such a core-shell structure can be formed by water-mediated polymerization. In detail, a butadiene rubber is mixed with water and polymerized to form butadiene rubber particles. An unsaturated monomer is then added to the water medium and graft copolymerized to the surface of the butadiene rubber particles (cores) to form an outer shell. Such core-shell butadiene rubber particles preferably include those composed of a core made of a styrene-butadiene copolymer core and an outer shell made of methyl methacrylate or a methyl methacrylate-styrene copolymer. They preferably have a butadiene content of 70% by weight or less and a methyl methacrylate content of 15% by weight or more. They still preferably have a butadiene content of 40 to 70% by weight and a total content of methyl methacrylate and styrene of 30 to 60% by weight at a styrene to methyl methacrylate weight ratio of 0.5 to 2.0.

The butadiene rubber particles as component (C) should have an average particle size of its secondary particles of 100 μm or smaller. A preferred average particle size of the secondary particles is 20 to 100 μm, particularly 20 to 50 μm. The average particle size od secondary particles falling within a range of from 20 to 100 μm secures handling properties and dispersibility of the powder.

The butadiene rubber particles as component (C) should have such a size distribution that the proportion of secondary particles having a particle size of 250 μm or smaller is 97% by weight or more, and the proportion of secondary particles having a particle size of 150 μm or smaller is 80% by weight or more. It is preferred that the maximum particle size of secondary particles be 250 μm or smaller, and the proportion of secondary particles having a particle size of 150 μm or smaller be 100% by weight. If the proportion of secondary particles of a particle size of 150 μm or smaller is less than 80% by weight, the rubber particles are not sufficiently dispersed when melt kneaded in a kneading machine. If the proportion of secondary particles of a particle size of 250 μm or smaller is less than 97% by weight, narrow parts of gold wires and lead pins will be clogged with the particles to cause deformation or cut of the gold wires, and deformation of lead pins. The secondary particles are observable as black spots in a molded resin in, for example, an X-ray photograph or an ultrasonic micrograph.

Component (C) is preferably used in an amount of 0.1 to 4.0% by weight, particularly 0.1 to 2% by weight, based on the total epoxy resin composition. In amounts less than 0.1% by weight, the butadiene rubber particles tend to fail to produce sufficient effects in reducing the stress. In amounts exceeding 4.0% by weight, the reliability of the semiconductor element tends to be impaired due to the ionic impurities contained in the rubber particles, and the rubber particles tend to fail to be dispersed with sufficient uniformity.

The epoxy resin composition comprising components (A) to (C) can further comprise (D) silicone oil having at least one amino group per molecule. Addition of the specific silicone oil brings about further improvement on reliability against moisture. This seems to be because the silicone oil acts like a surface treating agent to improve adhesion between the epoxy resin composition and a semiconductor element and also because the water repellency of the silicone oil contributes to moisture resistance. Preferred silicone oil as component (D) includes one represented by formula (I):

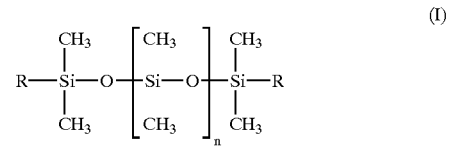

(I)

wherein two R's, which may be the same or different, each represent a monovalent organic group having an amino group; and n represents an integer of 0 to 40.

The silicone oil typically exemplified by the one represented by formula (I) is prepared in a known manner. It is preferably used in an amount of 0.01 to 1.0% by weight, particularly 0.01 to 0.3% by weight, based on the total epoxy resin composition. Sufficient effects on reliability against moisture are not produced with an amount less than 0.01% by weight. Addition of more than 1.0% by weight of the silicone oil tends to reduce the molding properties of the epoxy resin composition. The silicone oil to be used usually has a molecular weight of about 300 to 2000. In using the silicone oil of formula (I), an aminopropyl-terminated dimethylsiloxane having the n number of 0 to 40 is usually used, in which the n number is preferably 0 to 20. In formula (I), the amino-containing monovalent organic group R is preferably an amino-containing alkyl group having 1 to 8 carbon atoms. Of these preferred aminoalkyl-terminated dimethylsiloxane compounds, aminopropyl-terminated dimethylsiloxanes represented by formula (II) are still preferred.

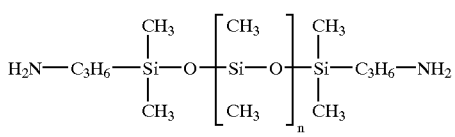

wherein n is 0 to 20.

In addition to components (A) to (D), the epoxy resin composition can further contain, if desired, various appropriate additives, such as cure accelerators, inorganic fillers, halogen-containing flame retardants (e.g., brominated novolak epoxy resin) and assistants therefor (e.g., antimony trioxide), pigments (e.g., carbon black), and silane coupling agents (e.g., γ-glycidoxy-propyl-trimethoxysilane, γ-mercaptopropyl-tri-methoxysilane, and γ-aminoethyl-aminopropyl-trimethoxysilane).

The cure accelerators include amine type cure accelerators and phosphorus type cure accelerators. Useful amine type cure accelerators include imidazoles (e.g., 2-methyl imidazole) and tertiary amines (e.g., triethanol-amine and diazabicyclo-undecene). Useful phosphorus type cure accelerators include triphenylphosphine. These cure accelerators can be added either individually or as a combination thereof. The cure accelerators is preferably added in an amount of 0.1 to 1.0% by weight based on the total epoxy resin composition. Flowability of the resin composition being taken into consideration, a still preferred amount is 0.15 to 0.35% by weight.

The inorganic fillers that can be added to the composition are not particularly limited, and customarily employed ones, such as quartz glass powder, silica powder, alumina and talc, can be used. Spherical fused silica powder is particularly preferred. The inorganic filler is preferably used in an amount of 70 to 95% by weight based on the total epoxy resin composition.

The epoxy resin composition of the invention can be prepared, for example, as follows. The essential components (A) to (C), optional component (D) and necessary additives are compounded all at once by melt kneading under heat in a kneading machine, such as a mixing roll. After cooling the molten mixture to room temperature, the mixture is ground in a conventional manner. If desired, the resulting powder is pressed into tablets.

The butadiene rubber particles (component (C)) do not greatly change their secondary particle sizes while being kneaded in so far as an ordinary mixing method is used. It is believed that the secondary particle size does not undergo great change either while the epoxy resin composition is molded and cured.

The epoxy resin composition of the invention can also be prepared by preliminarily melt mixing component (C) with the whole or part of component (A) or (B) and further melt mixing the other components into the molten mixture, followed by cooling, grinding and, if desired, pressing into tablets.

Encapsulation of a semiconductor element in the epoxy resin composition of the invention is not particularly limited and can be carried out in a known molding method, typically transfer molding.

The semiconductor device thus obtained is excellent in low stress properties owing to the butadiene rubber particles having specific secondary particle characteristics which are uniformly dispersed in the epoxy resin composition.

The present invention will now be illustrated in greater detail with reference to Examples and Comparative Examples, but it should be understood that the invention is not deemed to be limited thereto. Unless otherwise noted, all the percents are given by weight. Materials used in Examples and Comparative Examples are as follows.

Epoxy resin: o-Cresol novolak epoxy resin (epoxy equivalent: 200; softening point: 85° C.)
Phenolic resin A: Phenol novolak resin (hydroxyl equivalent: 110; softening point: 80° C.)
Phenolic resin B: Phenol aralkyl resin represented by formula (III) (hydroxyl equivalent: 170; softening point: 80° C.)

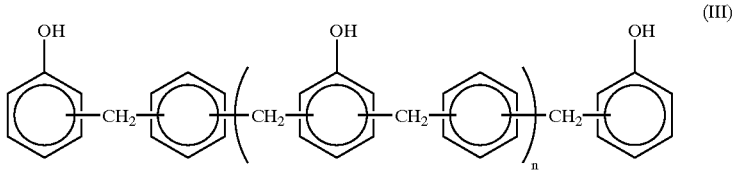

wherein n is 0 to 10.
Brominated epoxy resin (flame retardant): Brominated novolak epoxy resin (epoxy equivalent: 275; softening point: 85° C.)
Flame retardant assistant: Antimony trioxide
Silicone oil: Aminopropyl-terminated dimethylsiloxane represented by formula (IV):

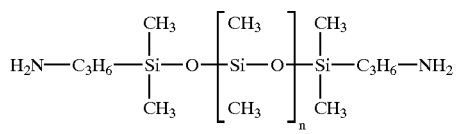

wherein n is 4 to 8.
Release agent: Carnauba wax
Cure accelerator: 1,8-Diazabicyclo[5.4.0]undecene-7 (DBU)
Pigment: Carbon black
Silica powder: Spherical fused silica powder (average particle size: 25 μm)
Silane coupling agent A: γ-Glycidoxy-propyl-trimethoxysilane
Silane coupling agent B: γ-Mercaptopropyl-trimethoxysilane
Butadiene rubber particles c1: Methyl methacrylate-butadiene-styrene copolymer (primary particle size: 0.2 μm; average secondary particle size: 150 μm; secondary particles of 150 μm or smaller: 50%; secondary particles greater than 250 μm: 25%; secondary particles of 500 μm or greater: 15%; butadiene content: about 50%; methyl methacrylate content: about 20%)

Butadiene rubber particles c2 to c6: Butadiene rubber particles c1 were freeze-ground using liquid nitrogen and classified. Grinds of different sizes were appropriately mixed up to prepare butadiene rubber particles c2 to c6 shown in Table 1 below.

TABLE 1

| | Butadiene Rubber Particles | | | | | |
|---|---|---|---|---|---|---|
| | C1 | c2 | c3 | c4 | c5 | c6 |
| Avg. sec. particle size (μm) | 150 | 20 | 50 | 70 | 70 | 70 |
| Ratio of sec. particles of 150 μm or smaller (wt %) | 50 | 100 | 90 | 80 | 80 | 70 |
| Ratio of sec. particles of 250 μm or smaller (wt %) | 75 | 100 | 100 | 100 | 95 | 100 |
| Ratio of sec. particles greater than 250 μm (wt %) | 25 | 0 | 0 | 0 | 5 | 0 |
| Ratio of sec. particles of 500 μm or greater (wt %) | 15 | 0 | 0 | 0 | 0 | 0 |

EXAMPLES 1 TO 11 AND COMPARATIVE EXAMPLES 1 TO 7

Materials shown in Tables 2 and 3 below were compounded all at once and melt kneaded in a roll mill heated at 100° to 120° C. for 5 minutes. After cooling, the compound was ground to powder and pressed into tablets to obtain an epoxy resin composition for semiconductor encapsulation.

TABLE 2

| | Example No. | | | | | | | | | | |
|---|---|---|---|---|---|---|---|---|---|---|---|
| Composition (wt %) | 1 | 2 | 3 | 4 | 5 | 6 | 7 | 8 | 9 | 10 | 11 |
| Epoxy resin | 100 | 100 | 100 | 100 | 100 | 100 | 100 | 80 | 90 | 80 | 80 |
| Phenolic resin | | | | | | | | | | | |
| A | 60 | 60 | 60 | 60 | 60 | 60 | 60 | — | 30 | — | — |
| B | — | — | — | — | — | — | — | 80 | 40 | 80 | 80 |
| Brominated epoxy resin | 10 | 10 | 10 | 10 | 10 | 10 | 10 | 10 | 10 | 10 | 10 |
| Flame retardant assistant | 8 | 8 | 8 | 8 | 8 | 8 | 8 | 8 | 8 | 8 | 8 |
| Butadiene Rubber Particles | | | | | | | | | | | |
| c1 | — | — | — | — | — | — | — | — | — | — | — |
| c2 | 7 | 7 | 7 | — | — | — | — | 7 | 7 | 7 | 7 |
| c3 | — | — | — | 7 | — | 4 | 10 | — | — | — | — |
| c4 | — | — | — | — | 7 | — | — | — | — | — | — |
| c5 | — | — | — | — | — | — | — | — | — | — | — |
| c6 | — | — | — | — | — | — | — | — | — | — | — |
| Silicone oil | — | 2 | 2 | — | 2 | 1 | 2 | 2 | 2 | 0.1 | 6 |
| Release agent | 5 | 5 | 5 | 5 | 5 | 5 | 5 | 5 | 5 | 5 | 5 |
| Cure accelerator | 2 | 2 | 2 | 2 | 2 | 2 | 2 | 2 | 2 | 2 | 2 |
| Pigment | 4 | 4 | 4 | 4 | 4 | 4 | 4 | 4 | 4 | 4 | 4 |
| Silica powder | 500 | 500 | 500 | 500 | 500 | 500 | 500 | 500 | 500 | 500 | 500 |
| Silane coupling agent | | | | | | | | | | | |
| A | 3 | 3 | — | 3 | 3 | — | — | 3 | — | 3 | 3 |
| B | — | — | — | — | — | — | — | — | 3 | — | — |

| | Comparative Example No. | | | | | | |
|---|---|---|---|---|---|---|---|
| Composition (wt %) | 1 | 2 | 3 | 4 | 5 | 6 | 7 |
| Epoxy resin | 100 | 100 | 100 | 100 | 100 | 100 | 100 |
| Phenolic resin | | | | | | | |
| A | 60 | 60 | 60 | 60 | 60 | 60 | 60 |
| B | — | — | — | — | — | — | — |
| Brominated epoxy resin | 10 | 10 | 10 | 10 | 10 | 10 | 10 |
| Flame retardant assistant | 8 | 8 | 8 | 8 | 8 | 8 | 8 |
| Butadiene Rubber Particles | | | | | | | |
| c1 | 7 | — | — | — | — | — | 10 |
| c2 | — | — | — | — | — | — | — |
| c3 | — | — | — | — | — | — | — |
| c4 | — | — | — | — | — | — | — |
| c5 | — | — | — | 7 | — | 10 | — |
| c6 | — | — | 7 | — | 4 | — | — |
| Silicone oil | — | — | 2 | — | 2 | 1 | 2 |
| Release agent | 5 | 5 | 5 | 5 | 5 | 5 | 5 |

TABLE 2-continued

| | | | | | | | |
|---|---|---|---|---|---|---|---|
| Cure accelerator | 2 | 2 | 2 | 2 | 2 | 2 | 2 |
| Pigment | 4 | 4 | 4 | 4 | 4 | 4 | 4 |
| Silica powder | 500 | 500 | 500 | 500 | 500 | 500 | 500 |
| Silane coupling agent | | | | | | | |
| A | 3 | 3 | — | 3 | — | 3 | — |
| B | — | — | — | — | — | — | — |

The epoxy resin compositions prepared in Examples and Comparative Examples were evaluated as follows. The results obtained are shown in Tables 3 and 4 below.

1) Number of Agglomerates

Tablets were transfer molded (175° C.×2 min.) to prepare a 28-pin small outline J lead package (SOJ-28p) for a semiconductor element. The number of black spots, which are agglomerates of rubber particles, in the package was counted with a scanning acoustic tomograph.

2) Reliability Against Moisture

A semiconductor element (3 mm×5 mm) having aluminum electrodes deposited thereon was mounted on a metal frame for a 16-pin dual inline package (DIP-16). After wire bonding, the chip was sealed in the epoxy resin composition. The resulting semiconductor devices were subjected to an initial electrical test. Those accepted in the test were put in a pressure cooker kept at 125° C. and 85% RH, and a bias voltage of 30 V was applied (PCB test), and the resistivity was measured at regular time intervals. The devices whose resistivity increased twice or more in the PCB test were rejected, and the time when half of the tested devices were rejected was recorded.

3) Linear Expansion Coefficient, Flexural Modulus, and Stress Index

Test specimens were molded from the epoxy resin composition, and a linear expansion coefficient ($\alpha$) and a flexural modulus (E) were measured with a thermomechanical analyzer (MJ-800GM, manufactured by Rigakusha) and a bending tester (Autograph AG-500C, manufactured by Shimadzu Corp.), respectively. The product of the linear expansion coefficient ($\alpha$) and the flexural modulus (E), $\alpha \times E$, was obtained as a stress index.

TABLE 3

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| Number of agglomerates of rubber particles per package | 0 | 2 | 3 | 5 | 0 | 1 | 8 | 4 | 3 | 3 | 3 |
| Average life in PCB test (hr) | 550 | 700 | 700 | 550 | 600 | 600 | 600 | 700 | 650 | 700 | 710 |
| Flexural modulus (E) (kg/mm$^2$) | 1300 | 1320 | 1320 | 1350 | 1300 | 1380 | 1250 | 1250 | 1320 | 1350 | 1100 |
| Linear expansion coefficient ($\alpha$); ×10$^{-6}$ (1/° C.) | 1.8 | 1.8 | 1.8 | 1.8 | 1.8 | 1.8 | 1.8 | 1.8 | 1.8 | 1.8 | 1.8 |
| Stress index ($\alpha \times E$) | 2340 | 2376 | 2376 | 2430 | 2340 | 2484 | 2250 | 2250 | 2376 | 2430 | 1980 |

TABLE 4

| | Comparative Example No. | | | | | | |
|---|---|---|---|---|---|---|---|
| | 1 | 2 | 3 | 4 | 5 | 6 | 7 |
| Number of agglomerates of rubber particles per package | <50 | — | 30 | <50 | 18 | <50 | <50 |
| Average life in PCB test (hr) | 450 | 450 | 500 | 400 | 500 | 500 | 500 |
| Flexural modulus (E) (kg/mm$^2$) | 1350 | 1590 | 1350 | 1350 | 1400 | 1280 | 1300 |
| Linear expansion coefficient ($\alpha$); ×10$^{-6}$ (1/° C.) | 1.8 | 2.0 | 1.8 | 1.9 | 1.8 | 1.9 | 1.9 |
| Stress index ($\alpha \times E$) | 2430 | 3180 | 2430 | 2565 | 2520 | 2430 | 2470 |

As can be seen from the results in Tables 3 and 4, more agglomerates of rubber particles, seen as black spots, were observed in the cured resins of Comparative Examples than in those of Examples, and the samples of Comparative Examples had shorter average life in the PCB test than the samples of Examples, indicating poorer reliability against moisture attack. Compared with the comparative samples, the samples of Examples had a longer average life and lower values in both linear expansion coefficient and stress index.

As described above, the present invention can obtain an epoxy resin composition for semiconductor encapsulation by containing butadiene rubber particles (component C) together with the epoxy resin (component A) and phenolic resin (component B). Thus, despite of containing the butadiene rubber particles (component C) together with other components, since the butadiene rubber particles comprise the above-described specific secondary particles, the butadiene rubber particles (component C) in the epoxy resin composition for semiconductor encapsulation of the present invention are uniformly dispersed in the epoxy resin composition. As a result, butadiene rubber particles do not agglomerate, so that rubber particles having a large particle sized are not formed, and it is also not necessary to pass complicated steps. This makes it possible to easily obtain the epoxy resin composition for semiconductor encapsulation at low cost. Further, the semiconductor device of the present invention is prepared by encapsulating a semiconductor element using a specific epoxy resin composition having the butadiene rubber particles (component C) uniformly dispersed therein. Therefore, in the semiconductor device of the present invention, the butadiene rubber particles (component C) comprising the specific secondary particles are uniformly dispersed in the encapsulating resin, so that the semiconductor device is provides with excellent low stress properties.

While the invention has been described in detail and with reference to specific examples thereof, it will be apparent to one skilled in the art that various changes and modifications can be made therein without departing from the spirit and scope thereof.

What is claimed is:

1. An epoxy resin composition for semiconductor encapsulation, comprising:

(A) an epoxy resin, (B) a phenolic resin, (C) butadiene rubber particles having an average particle size of secondary particles of 100 $\mu$m or smaller and having such a size distribution that the proportion of secondary particles having a particle size of 250 $\mu$m or smaller is 97% by weight or more, and the proportion of secondary particles having a particle size of 150 $\mu$m or smaller is 80% by weight or more; and (D) silicone oil having at least one amino group per molecule.

2. The epoxy resin composition as claimed in claim 1, wherein said butadiene rubber particles as component (C) is present in an amount of 0.1 to 4.0% by weight based on the total composition.

3. The epoxy resin composition as claimed in claim 1, wherein said butadiene rubber particles as component (C) is a methyl methacrylate-butadiene-styrene copolymer.

4. The epoxy resin composition as claimed in claim 1, wherein said butadiene rubber particles as component (C) has a core-shell structure, wherein the core portion comprises a styrene-butadiene copolymer, and the shell portion comprises methyl methacrylate or a methyl methacrylate-styrene copolymer.

* * * * *